(12) United States Patent
Chang

(10) Patent No.: US 7,630,959 B2
(45) Date of Patent: Dec. 8, 2009

(54) SYSTEM AND METHOD FOR PROCESSING DATABASE QUERIES

(75) Inventor: Kae-por F. Chang, Needham, MA (US)

(73) Assignee: Imagitas, Inc., Waltham, MA (US)

( * ) Notice: Subject to any disclaimer, the term of this patent is extended or adjusted under 35 U.S.C. 154(b) by 0 days.

(21) Appl. No.: 09/947,944

(22) Filed: Sep. 6, 2001

(65) Prior Publication Data

US 2002/0103794 A1 Aug. 1, 2002

Related U.S. Application Data

(60) Provisional application No. 60/230,354, filed on Sep. 6, 2000.

(51) Int. Cl.
*G06F 17/30* (2006.01)
(52) U.S. Cl. .................... 707/3; 707/4; 707/6
(58) Field of Classification Search .......... 707/1–6, 707/100–102, 103 X, 104.1, 200, 10
See application file for complete search history.

(56) References Cited

U.S. PATENT DOCUMENTS

| | | | | |
|---|---|---|---|---|
| 5,842,203 A * | 11/1998 | D'Elena et al. | .......... | 707/4 |
| 6,175,829 B1 * | 1/2001 | Li et al. | .......... | 707/3 |
| 6,233,618 B1 * | 5/2001 | Shannon | .......... | 709/229 |
| 6,341,277 B1 * | 1/2002 | Coden et al. | .......... | 707/2 |
| 6,397,221 B1 * | 5/2002 | Greef et al. | .......... | 707/102 |
| 6,564,204 B1 * | 5/2003 | Amundsen et al. | .......... | 707/2 |
| 6,654,749 B1 * | 11/2003 | Nashed | .......... | 707/10 |
| 2002/0016786 A1 * | 2/2002 | Pitkow et al. | .......... | 707/3 |
| 2002/0069218 A1 * | 6/2002 | Sull et al. | .......... | 707/501.1 |
| 2006/0036588 A1 * | 2/2006 | Frank et al. | .......... | 707/3 |

* cited by examiner

*Primary Examiner*—Mohammad Ali
*Assistant Examiner*—Marc R Filipczyk
(74) *Attorney, Agent, or Firm*—George M. Macdonald; Angelo N. Chaclas

(57) ABSTRACT

A system and method is provided wherein a user chooses from an allowed preselected domain of query element values, presenting a query comprising a plurality of selected query element values, which form the basis for indexing query results. A database lookup is done according to the user's selections and index values, as well as relevancy values of other members of the allowed preselected domain of query element values. In some embodiments the query results are assigned to arbitrary tags or numbers to prevent unauthorized competing search providers from appropriating the query results.

32 Claims, 7 Drawing Sheets

| LINK | ID NO. | LAST CHECK | LAST STATUS |
|---|---|---|---|
| http://www.usps.com | 0027 | Jan. 1, 2000 10:01AM | GOOD |
| http://www.abcd.com | 0008 | Mar. 6, 1963 12:31AM | BAD |
| http://www.uspto.gov | 0013 | Aug. 2, 2001 06:18PM | GOOD |
| ... | ... | ... | ... |

(602) LINK
(603) ID NO.
(604) LAST CHECK
(605) LAST STATUS
Table (601)

*Fig. 7*

SYSTEM AND METHOD FOR PROCESSING DATABASE QUERIES

RELATED APPLICATIONS

The present application claims the benefit, under 35 U.S.C. §119(e), of U.S. Provisional Application Ser. No. 60/230,354, filed Sep. 6, 2000, and entitled "System and Method for Processing Database Queries" which is hereby incorporated by reference.

FIELD OF THE INVENTION

The field of the invention relates generally to databases, and more particularly to processing database queries.

BACKGROUND

Computer systems having databases are generally used to store and obtain information. These computer systems may be stand-alone computers that serve one or more users, or the systems may be networked to provide access to a database from multiple systems referred to as clients. These database systems carry out communication with clients through one or more communication protocols, as is known in the art. For example, these database and clients may communicate over a network, such as the Internet, using the well-known TCP/IP protocol. The client systems may interact with the database using one or more application programs such as an Internet browser which accepts input from a user and display information received from database systems. The database may be, for example, a relational database which stores character, binary, or other data format that may be searched and retrieved.

Database access has become standard for supporting operations performed on networks such as the Internet. For example, databases are used to support searching, by providing a resource which stores links to data resources and to other databases. For example, databases are used to classify and store links, called Uniform Resource Locators (URLs) that serve as addresses to resources such as Web sites, audio/video files, and other types of media. These addresses are provided by database systems in response to queries submitted to the database systems through interfaces to the database systems displayed in browser applications. These database systems are sometimes referred to as search engines, and may be used as a part of a directory service, company's Web site, or any other method for searching and retrieving information.

Interfaces for databases generally include a text entry field, wherein a user may enter one or more keywords associated with what he or she is searching for. These keywords are processed by the database system, and a set of results is displayed to the user. The user then reviews these results to determine how pertinent the results are to what he or she is looking for. These databases function as a directory services for resources on the Internet. Examples of such searching systems include Yahoo!, Google, and others. Yahoo! and other search engines generally provide two methods for finding information. First, a directory method, which provides pathways for navigating through content related by a logical relationship. The second method is a key word search. Some services such as Yahoo! utilize the catalog information provided by other services such as Google for performing the search.

One main problem with existing systems that use the directory search method is that a user must navigate hierarchical directory structures. Taking a "wrong" or a non-ideal "turn" in the search path, by selecting a branch in the search which leads away from the best result, will significantly degrade the final outcome of the user's search.

Keyword search systems generally accept keyword entry and display a number of results, the results being ordered based upon the frequency of the keyword appearing in the resource, or some other ranking criteria. The database systems perform preprocessing on the resources by indexing data of the resources by keywords. This involves analyzing Internet resources with programs referred to as Web spiders or crawlers which visit Internet links and perform keyword processing on resource content associated with the link, generally involving millions of processed resources. Furthermore, a perplexingly large number of search results is typically returned by such keyword search engines. Thousands of search results are usually presented to the user, and the sorting of the search results can involve errors due to the automated indexing of the search results or the difficulties described above.

Further, more simple keyword association and relevancy also produce irrelevant results sometimes. When documents are retrieved based upon a keyword search, resources such as documents having those combination of keywords are retrieved, even though the documents' content may not be relevant. A user must evaluate individually each link to determine whether an indicated document is relevant. Also, the number of records produced is generally large, and a query retrieving thousands of records is not uncommon. Retrieving large number of records is problematic to a user, as the process of reviewing each link is tedious and time-consuming for the user and requires excessive computational resources.

Keywords and other natural language (NL) inputs are generally processed by the system as shown in FIG. 1, which shows a conventional NL searching system 10. Natural language searches generally begin with a user 100 entering an unstructured query 102 into an interface associated with the database search system. A NL query preprocessor 104 processes the unstructured query 102 to determine the meaning of the query. This meaning is formulated into predetermined search criteria 106, which are provided to a query keyword parser 108, which associates meaning for each of the keywords, and may expand the query by generating similar terms for one or more keywords. The unstructured query 102 is also passed directly to the query keyword parser 108 that processes the unstructured query 102 to determine keywords and logical operators 110 connecting those keywords. For example, an input query of "map and Massachusetts" might produce, by the query keyword parser 108, the keywords "map" and "Massachusetts" with a logical operator "and." The NL query preprocessor 104 may also determine that the user wants driving directions for Massachusetts, or to retrieve maps of major metropolitan areas, based on the meaning of the phrase "map and Massachusetts."

A database 150 is indexed by keywords in this case, and those keywords and logical operators are compared to that of the keyword index to produce a (typically large) number of search results 118. These search results 118 are presented to the user 100 by a query result presenter 120, within a graphical user interface, and are generally ranked by relating the keywords to the database entries.

As discussed above, search engines may include a NL query preprocessor 104 which attributes some meaning to the terms. For instance, this may be performed through analyzing lexical semantics which determines the meanings of each of the keywords, and by analyzing compositional semantics which is the knowledge of how keywords are combined to form larger meanings. In general, morphology is the study of the meaningful components of words, while syntax is the study of the relationship between words. There are also many other ways to analyze natural language. For example, semantics is the study of meaning, pragmatics is the study of how language is used to accomplish goals, and discourse is the study of linguistic units larger than a single utterance.

Because meaning may be attributed to a query at many levels, NL processing is a complex process which involves complex algorithms. Further, these algorithms are not perfect; there are frequent ambiguities in natural language interpretation. Because of these ambiguities, and because of the inherently subjective nature of database queries, NL processing of input queries yields imperfect search results. Natural language processing is more fully described in the book entitled "Natural Language Understanding" by James Allen, 2nd edition (January 1995), Addison-Wesley Publishing Co., which is hereby incorporated by reference.

As discussed, there are many drawbacks of implementing NL in association with database searching. For example, the user may pose a question, and the question is not interpreted properly, yielding incorrect results. The user may need to restructure the question in a different manner to obtain meaningful results.

There are sites that implement NL analysis such as the portal AskJeeves, which ascribes meaning to input queries by matching a user's question to a question that was previously defined. This portal allows a user to pose questions in a NL format, and retrieves the most relevant question based on a keyword analysis. However, as discussed above, natural language analysis produces ambiguous results and is complicated to perform. Thus, AskJeeves, and others, do not generally perform a perfect match. Further, questions posed to the system by a user do not necessarily have a corresponding question predefined in the system. Also, sample questions presented to the user in response to a query are usually not relevant. Because AskJeeves is linked to a keyword indexed database, the results returned must be processed by the user, and the AskJeeves system produces the same volume of information as standard keyword matching search engines.

Many database search engines also, in addition to keyword-based and NL-based search functions, provide a hierarchical listing of information to compliment these functions. This hierarchical listing is a categorization of links, usually programmed manually and take the form of directories. When new links are added, they are generally placed within the predetermined hierarchy or directory tree. As described earlier, navigating through a directory tree requires a user to accurately choose the best choice from a plurality of presented choices. The presented choices may themselves not include a choice corresponding to a path leading to the information the user actually desires to find. Making a non-ideal selection or being presented with selections none of which are ideal, forces a user down a search path that will not lead to the desired results. Also, excessively long search paths involving many user selections are generally required to reach the end point of a search. No logical relationship necessarily exists between members of a directory level or members of different directory levels. These difficulties cause directory-based search engines or navigators to be an inefficient means for retrieving information.

SUMMARY

According to one embodiment of the invention, a system and method is provided wherein common elements of questions, or "queries", are used to assist users in constructing their questions. In particular, users select a "query element" value from a list of allowed values, or a "domain," of each query element. Instead of using keywords and determining their relevancy to elements in a database, user-selected values of query elements of a query are used to retrieve indexed results from the database system. The database system may be, for example, a relational classification system. Information may be stored in the database by classifying the information by assigning, for an information object of the database, a number of values for each query element. Also, a relevancy index may be assigned among the allowed values of a query element, if multiple values of a query element are possible. According to one aspect of the invention, the query submitted by a user is restricted to one of a plurality of predefined formats and allowed values, and the predefined formats and allowed values are associated with database information objects.

Because it is the user's responsibility to properly phrase a query or search criteria in a text-free format, conventional systems perform only as good as the input provided by the user. According to various embodiments of the present invention, the query response information is provided in a non-hierarchical format, such that the user does not need to traverse directories or hierarchies to find the requested information.

Further, the amount of calculation carried out by the server to respond to a query and retrieve information is often far less than that required by standard keyword-parsing and NL-processing systems. Additionally, the database needed to store the information is reduced.

Some embodiments call for a human or a machine "editor" to sort and assign relevance values to query element values. This way an optimized first-time query brings up only the most relevant database search results.

Also, Internet links may be represented by arbitrary numbers, or codes, to prevent other Internet services from directly copying the search results. That is, to hide content from other Internet services, results such as links that are returned to the user are assigned arbitrary numbers used by the system to refer to the actual links.

Additionally, state information may be associated with the links and maintained by the server. In this way outdated links could be tracked and the system can determine the last date a link was checked, or whether a link was found valid, invalid, or had any other condition worthy of reporting. Accordingly, some embodiments of the invention are directed to:

A method for processing database queries, comprising: presenting, to a user, a plurality of query elements, each query element having a plurality of allowed query element values; receiving, from the user, a plurality of selected query element values, each selected query element value corresponding to a respective query element, wherein the value of each selected query elements is selected by the user from the respective plurality of allowed query element values corresponding to the respective query elements; indexing a database by forming an index from the selected query element values; and retrieving, from the database, information objects corresponding to the index.

A system for processing a database query, comprising: a server; a client coupled to the server through a network; a database coupled to the server, the database comprising information objects; a user interface running on the client for presenting query results to a user; a selector, implemented in the user interface, for allowing the user to select a plurality of selected query element values from respective pluralities of allowed query element values for respective query elements; and an indexer for forming an index to the database, using the selected query element values.

BRIEF DESCRIPTION OF THE DRAWINGS

FIG. 7 shows a table mapping link information, the table being maintained by a search system.

DETAILED DESCRIPTION

The present invention will be more completely understood through the following description, which should be read in conjunction with the accompanying drawings, in which similar reference numbers indicate similar structures.

Figure 1:
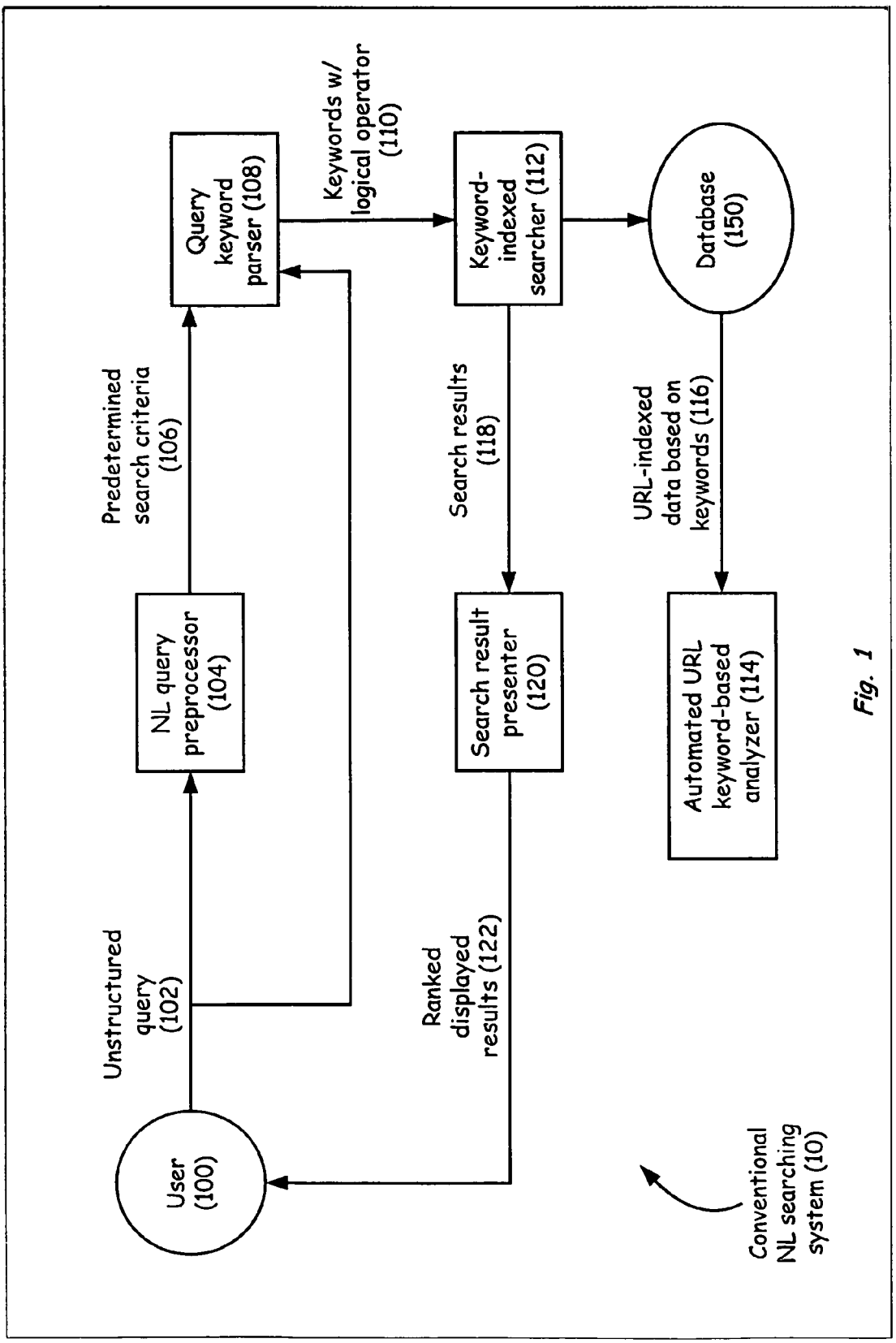
FIG. 1 shows a block diagram of a conventional NL search engine.
Figure 2:
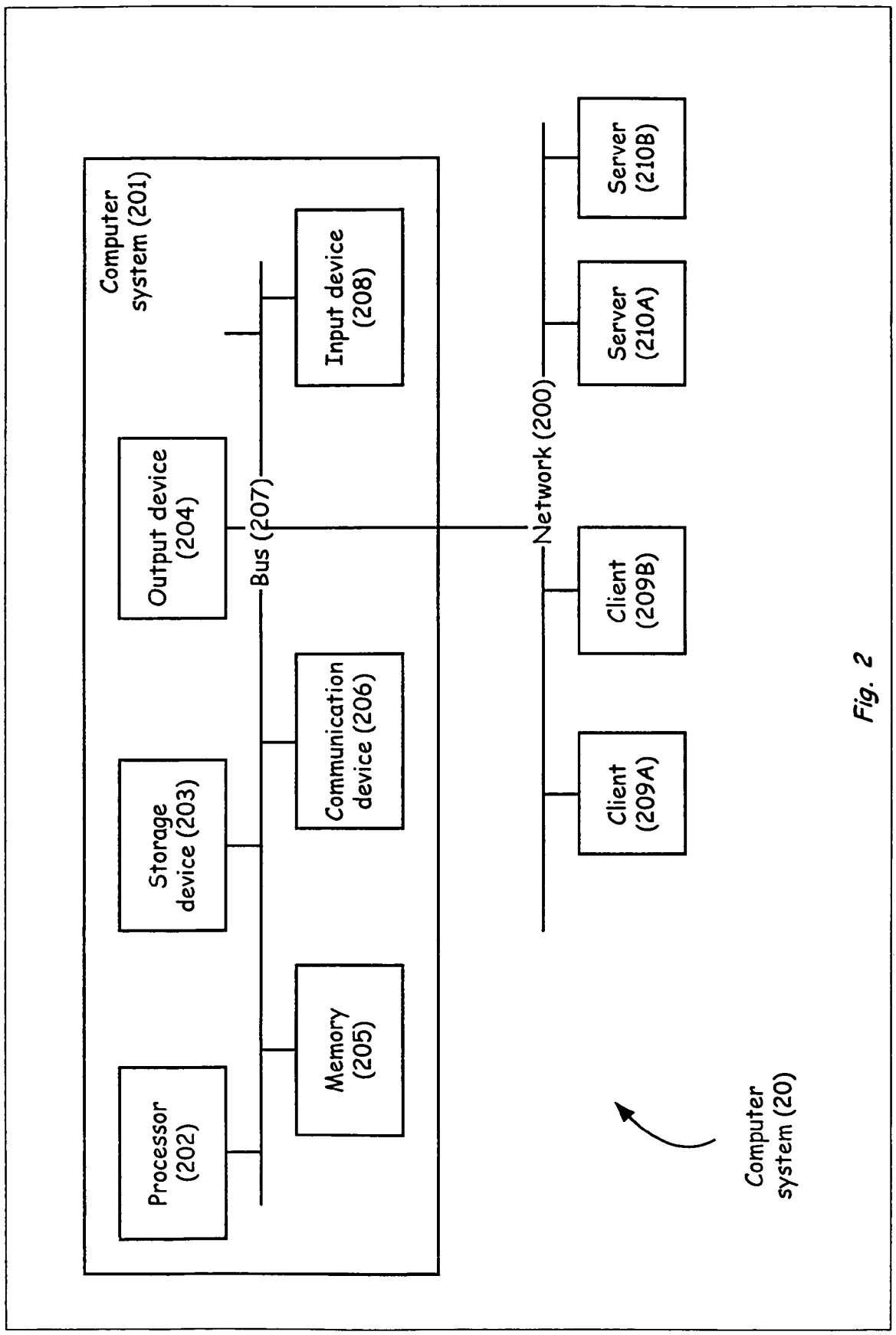
FIG. 2 shows a general purpose client-server computer system upon which various embodiments of the invention may be practiced.

FIG. 2 shows a computer system 20 suitable for implementing various embodiments of the present invention. One or more client systems 209A-B communicate with one or more server systems 210A-B for the purposes of exchanging information and performing transactions, such as database transactions. These systems communicate using a communication protocol over a network 200. Server 210 may be, for example, a hypertext transfer protocol (HTTP) server that is configured to perform database transactions. The servers 210 may accept and process search queries received from a user. In particular, a user may provide and receive, respectively, input/output through an interface of a client 209 system. The query information is transferred over the network 200 and stored and processed at one or more servers 210 using one or more communication protocols, such as TCP/IP and one or more transfer protocols such as HTTP. Other protocols are available as known or as becomes known to those skilled in the art.

The communication network 200 may be an Ethernet network, Fast Ethernet or other type of local or wide area network (LAN or WAN), a point-to-point network provided by telephone services, or other type of communication network or combination of networks. Information consumers and providers, also referred to in the art as client and server systems, respectively, communicate through the network 200 to exchange information.

Computer system 201 may include a processor 202 connected to one or more storage devices 203, such as a disk drive, through a communication device, such as a bus 207. The computer system 201 may also include one or more output devices 204, such as a monitor, printer, or graphic display, or printing device and one or more input devices 208 such as a keyboard, mouse or other device. The computer system 201 typically includes a memory 205 for storing programs and data during operation of the computer system 201. In addition, the computer system may contain one or more communication devices 206 that connect the computer system 201 to the communication network 200.

Computer system 201 may be a general purpose computer system that is programmable using a high-level computer programming language. The computer system 201 may also be implemented using specially-programmed, special-purpose hardware. In computer system 201, the processor 202 is typically a commercially-available processor, such as those available from the Intel Corporation, Sun Microsystems, or Motorola. The processor 202 usually executes an operating system which may be, for example, those available from the Microsoft Corporation, Apple Computer, Sun Microsystems, Palm, Inc. or other UNIX-based operating systems available from various sources.

It should be understood that the invention is not limited to a particular platform, processor, operating system, or network. Also, it should be apparent to those reading this application that the present invention is not limited to a specific programming language or computer system and that other appropriate programming languages and other appropriate computer systems could also be used.

In this application we generally consider that a database search operation, or query, is facilitated by breaking down the query into a plurality of query elements 400. The query elements 400 are predefined and comprise a set of allowed query elements 302. A user 100 uses a selector 510 built into a user interface 303 to select individual values from a domain comprising the allowed query elements 302. A particular chosen query element value, which is chosen from the domain or list of allowed query element values 302, is referred to as a selected query element value 430. Thus, the user 100 chooses a selected query element value 430 from the list of allowed query element values 420 which are defined for each query element 400.

Figure 3:
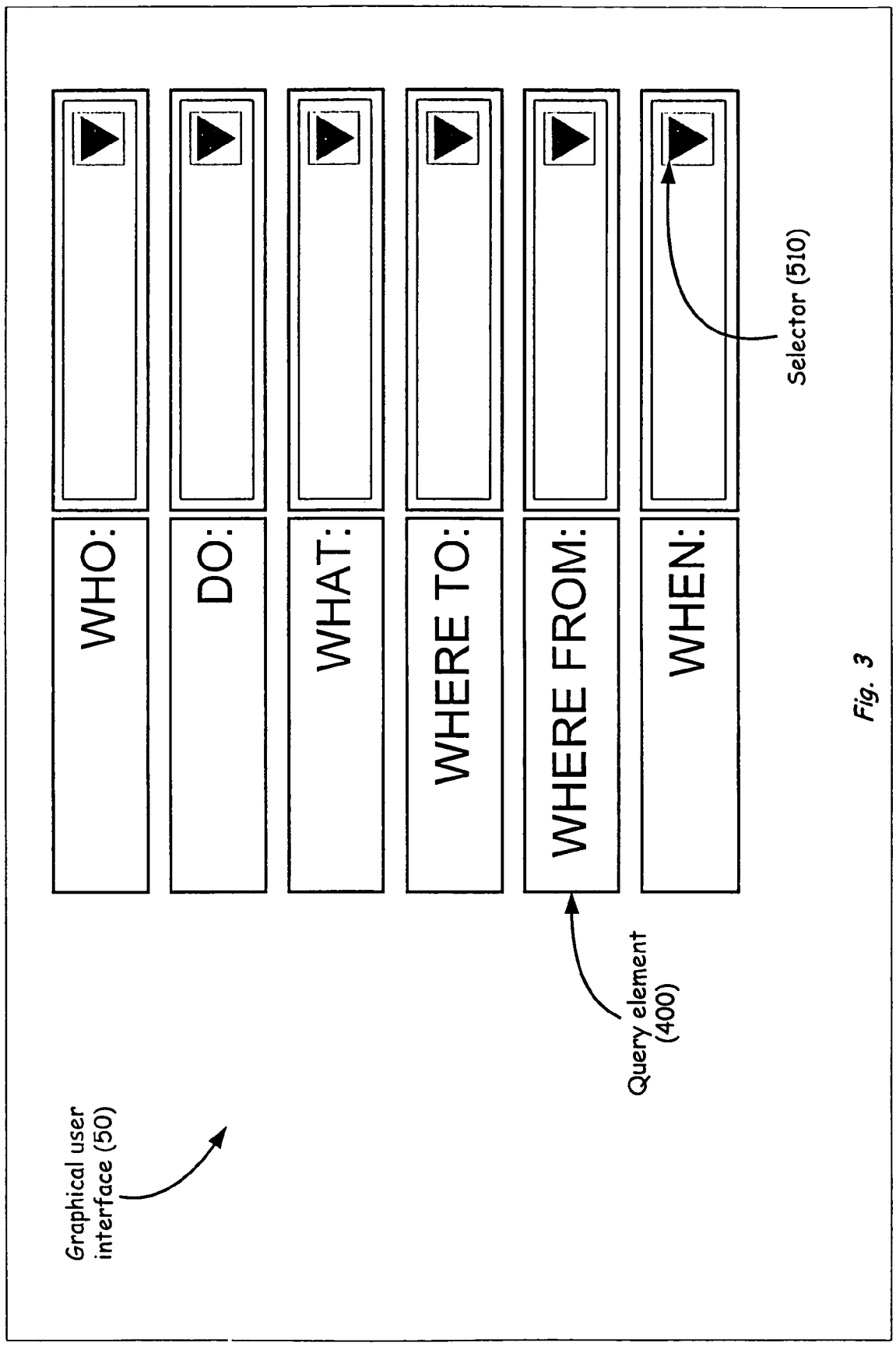
FIG. 3 shows an exemplary user interface in accordance with one embodiment of the invention.

FIG. 3 shows an example graphical user interface 50 according to one embodiment of the invention. An interface is provided that displays query elements 400 and a list of allowed query element values associated therewith. The list may be displayed, for example, using a selector 510, such as a data selection box, having a drop down list containing all of the allowed query document values 420. The selector 510 may also accept free text, and display matching values associated with the free text entry. Drop down boxes, menus, and text entry field are examples of methods for accepting selection information from users. It should be understood that other methods for conveying or displaying the query elements 400 and their allowed values 420 may be used. By limiting the user 100 to predetermined allowed query element values 420, the system guides the user 100 in properly forming queries, and obtaining more relevant results. The user interface 50 may be implemented, for example, using HTML, XML or other ways for representing user interfaces.

Figure 4:
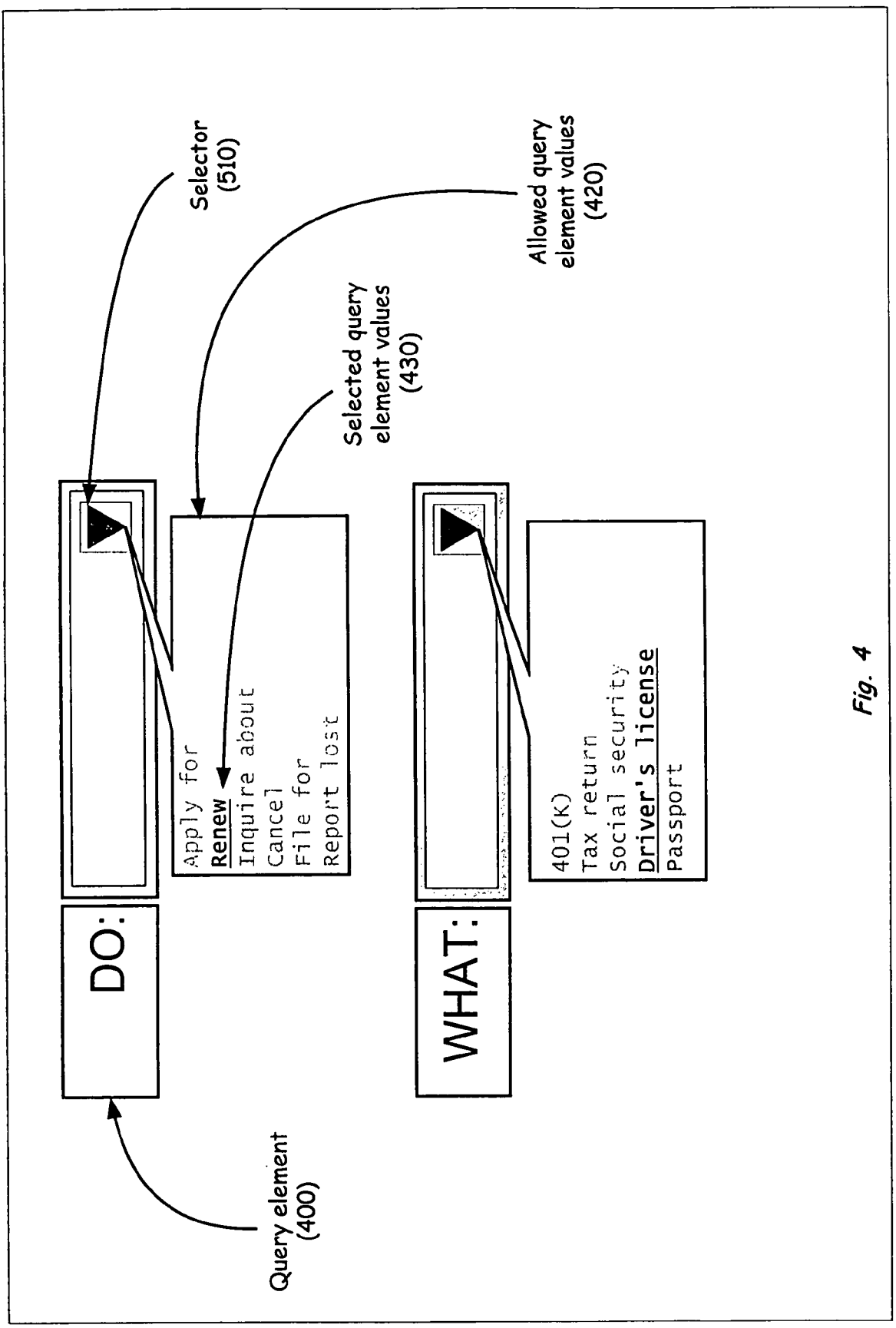
FIG. 4 shows two exemplary query elements and allowed query element values and selected query element values which can be selected using the selector.

FIG. 4 shows two query elements 400 in more detail. An exemplary "Do" and "What" query elements 400 illustrate how a query element 400 can have several allowed query element values 420 from which a user 100 can select a selected query element value 430. Here, the "Do" query element 400 is associated with a selector 510 that drops down a list of allowed query element values 420, or a domain. The allowed query element values 420 include the entries "Apply for; Renew; Inquire about, Cancel; File for; Report lost." From this list of allowed query element values 420, the selected query element value 430 "Renew" is chosen. Similarly, the "What" query element 400 is associated with a selector 510 that allows a user 100 to choose from preassigned allowed query element values 420. In this example the "What" query element 400 is associated with allowed query element values 420 "401K; Tax return; Social security; Driver's license; Passport." The query element value "Driver's license" has been selected as the selected query element value 430 for the "What" query element 400.

Other query elements 400, such as those depicted in FIG. 4, can be similarly assigned a selected query element value 430 for each. Note that it is possible for a user 100 to make no selection for one or more query elements 400 in some embodiments.

Additionally, each individual query element value may be assigned a query element relevancy 425. The query element relevancy 425 is a measure of the relevance of any individual query element value to others in the same domain or list of allowed query element values 420. Assigning such relevancy 425 can be helpful in guiding a user 100 through the query process, and in presenting and ranking other relevant query results for the user 100.

Figure 5:
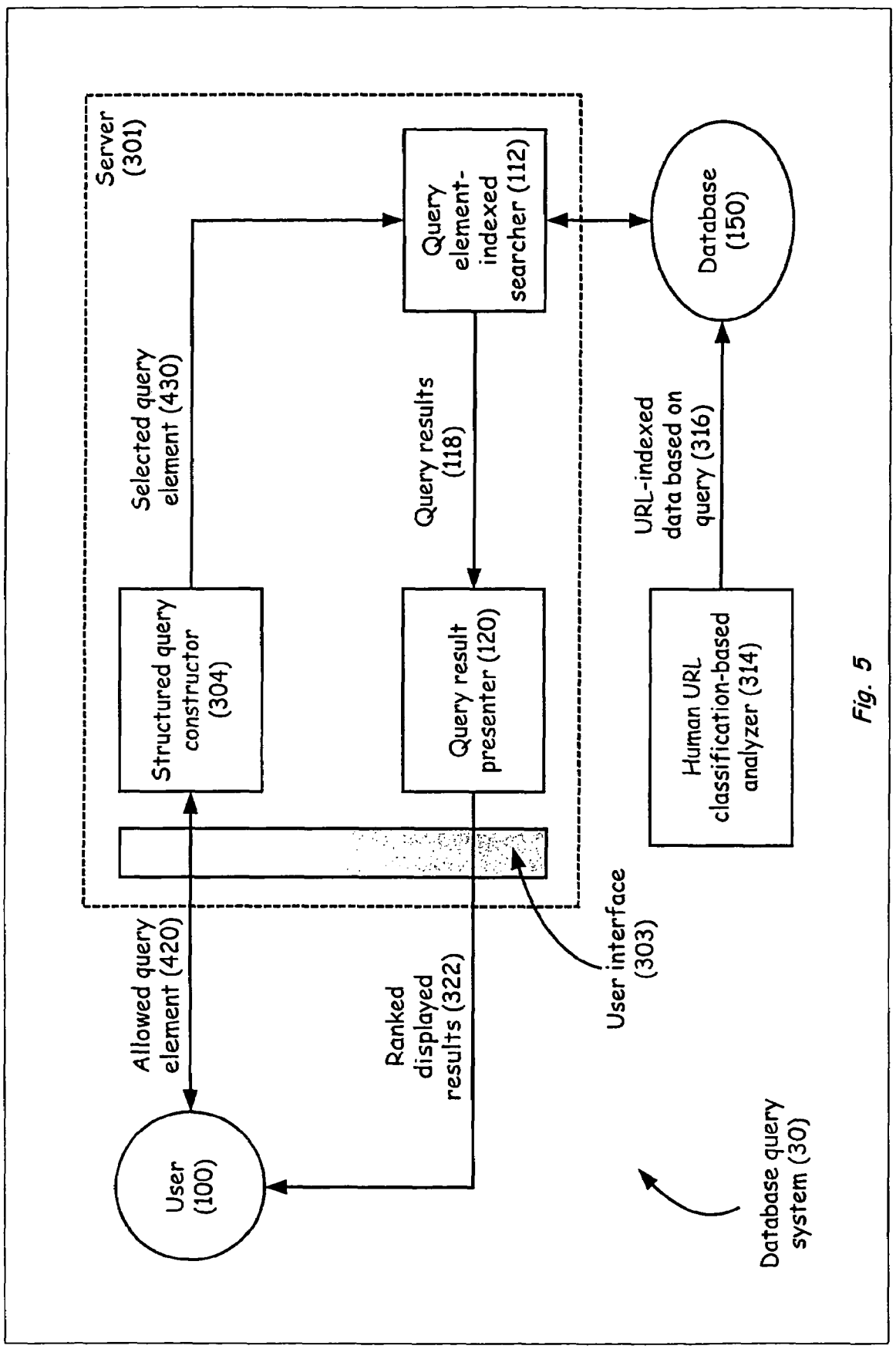
FIG. 5 shows a block diagram of a search system in accordance with one embodiment of the invention.

FIG. 5 shows a block diagram of a database query system 30, sometimes referred to as a "vortal" search service, that performs a database query according to one embodiment of the invention. Server 301, upon which various aspects of the invention may be implemented, may be for example, a general purpose computer system, as described above with reference to FIG. 2. Server 301 collects information provided by one or more clients 209. The clients 209 may be coupled to, or in use by a user 100. Clients 209 may also be general purpose computers.

According to one aspect of the invention, server 301 provides a user interface 303 through which database queries are performed. This user interface 303 may be, for example, a hypertext markup language (HTML) interface presented on a query result presenter, such as a Web browser. A structured query constructor 304 may be provided to facilitate the formulation of queries into query elements 400. Other types of interfaces are available. The user interface 303 allows the user 100 to select from a plurality of allowed query element values 420 for various query elements 400. By selecting a particular element/value combination, a query is defined. The query elements 400 and values are provided to a query element-indexed searcher 112, which accesses the database 150 by using query elements 400 and their selected query element values 430 as an index. The database 150 may be indexed, for example, manually by an editor, human or machine, or by a database administrator. The query results 118 of the query are then presented as ranked displayed results 322 to the user 100, and may be presented according to relevance by a query result presenter 120. The query results 118, for example, may be one or more information objects from the database 150 such as links.

In one embodiment of the invention, a relevancy is determined for each database object for domains having multiple possible values. In this manner, the query is executed based on values specified for each element against the classification of the information in the database rather than the information itself. Because keywords do not have to be indexed or NL analysis performed, search time is reduced. Also, because more relevant information is indexed, the result displayed to the user is more relevant, and unnecessary effort reviewing irrelevant links is not required.

It should be understood that one or more components of database query system 30 may be implemented on one or more systems, and the invention is not limited to a single system. For instance, the database 150 may be implemented on a separate general purpose computer system that communicates with the database query system 30 through a communications network 200. Other configurations of the system are possible.

Figure 6:
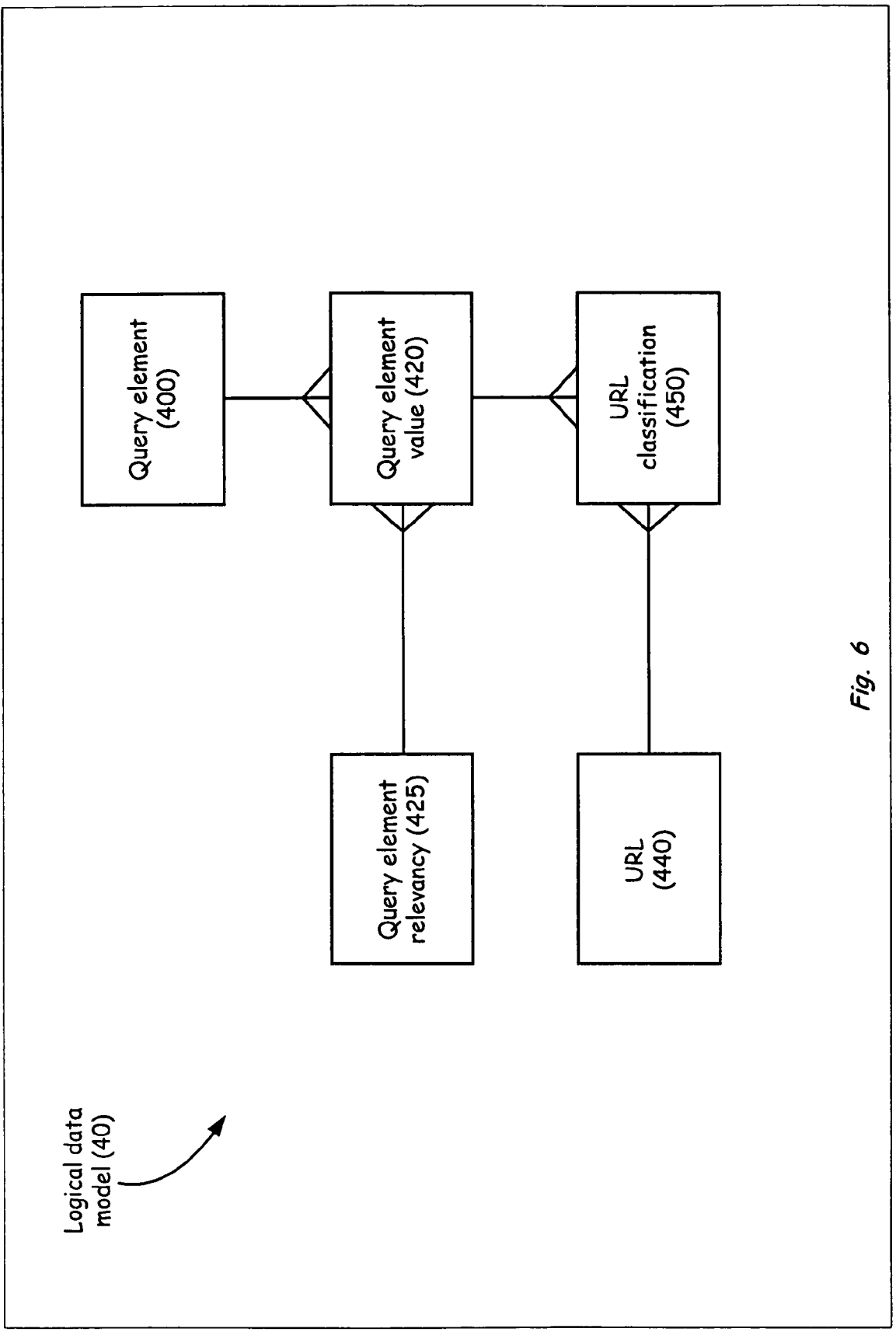
FIG. 6 shows a logical data model that may be implemented in the system shown in FIG. 3.

FIG. 6 shows a logical data model 40 that may be implemented in the system 30 shown in FIG. 5. A query element 400 is provided which is used to describe an aspect of the query to be performed on a database 150. For example, a query to be asked of the database may comprise one or more of the following query elements 400:

Who (element 1): the subject of the question
Do (element 2): the action performed
What (element 3): the object of the action
Where (elements 4): the location for the action
When (element 5): when the action was or will be performed In the context of a special purpose Internet site such as a government-related Internet site that handles processing of drivers' licenses, auto registrations, passports, tax returns, postal services, social security, and other aspects of government, the following query elements 400 and allowed values may be preassigned:

| | |
|---|---|
| Who (element 1): | Values: [I, my spouse, my family, my parents, etc.] |
| Do (element 2): | Values: [Apply for, renew, inquire about, cancel, file for, travel, know, etc.] |
| What (element 3) | Values: [Driver's license, 401K, passport, tax return, USPS, SSA, etc.] |
| Where/From__To (elements 4 and 5) | Values: [In the U.S., State, County, City, Zip, Country, etc.] |
| When (element 6): | Values: [in yearly increment, not applicable, etc.] |

For example, a user 100 may construct a query using the allowed query elements 420 and corresponding selected query element values 430 such as "[I] [apply for] [passport] [in U.S.]" or "[I] [renew] [driver's license] [in Massachusetts]." Sometimes the database 150 is indexed by the query elements 400 and the corresponding selected query elements 430 values, thus keyword or NL interpretation is not required.

Data may be classified in the database 150 by assigning or associating more than one value for each query element 400. For example, a Massachusetts driver's license application form (or reference or link thereto) may be stored as an information object in the database 150, and may be indexed by the following query elements 400 and their selected query element values 430:

| | |
|---|---|
| Who: | [All] |
| To: | [apply for] |
| What: | [driver's license] |
| Where: | [MA] |
| When: | [not applicable] |

Therefore, a user 100 requesting any information with [apply for] [driver's license] and [MA] as "To", "What", and "Where" elements will retrieve database information objects indexed by these query elements 400. In the database 150, an example entry for a database information object, such as a Uniform Resource Locator (URL) or a link associated with applying for a driver's license in Massachusetts may have the following entry:

<link information><All><apply for><driver's license><MA><not applicable>

As discussed, a relevancy 425 may be assigned among all the possible allowed query element values 420 for a query element 400 which will allow the system to determine the most relevant response to a query. For example, the "To" element may have two allowed query element vales 430—"Apply for" and "Renew." A 60% relevancy may be assigned to both values, such that if a user 100 selects "Apply for" as the selected value of the "To" query element 400, the information object assigned a value of "Renew" for the "To" element will also be retrieved, along with the "Apply for"

information object. Because the user 100 specified "Apply for," the database entries associated with the query element "Apply for" are assigned a relevancy value of 100% (a direct hit). Those database entries having a related query element will be displayed according to their assigned relevancy 425. Thus, a relevancy 425 may be assigned based on relevancy between query elements 400. This relevancy 425 may be assigned, for example, when database 150 entries are classified.

According to another aspect of the invention, the query results 118 returned to the user 100 are arbitrary numbers that are used by the system to refer to the actual links. In this manner, other Internet services are prevented from stealing query content, such as search results, from the database server 301. According to one embodiment of the invention, each link is assigned an arbitrary number, and the arbitrary number is associated with the actual link through a mapping that may be stored, for example, on the database server in a mapping table 601. The clients 209 query the server 301 and obtain query results 118, which include links that contain the address of a server and the arbitrary numbers instead of the actual links. When a user 100 selects a link, the resulting link request is brokered by the server 301 to the corresponding destination. That is, the server 301 performs the request on behalf of the client 209, and the content is returned by the server 301 to the client 209. The server 301 may also filter and replace that content, such that the client 209 does not obtain actual links; that is, the server 301 provides substituted links. Another way to think of this is to consider that information objects retrieved from the database 150 are mapped into mapped information objects.

Further, the mapping table 601 may also include other state information relating to the link, such as last check time 604 and last check status 605. In this way, state information for the links may be maintained by the server 301, and the server 301 may determine if these links are still valid.

FIG. 7 shows an example of a mapping table 601 for mapping link information, the table 601 being maintained by, for example, the search system 30 shown in FIG. 5. The table 601 includes link information 602 which may be URL information indicating the location of a resource. Associated with each URL is an arbitrary identification (ID) number 603 which is provided to a user 100 in response to queries. ID number 603 may be, for example, a unique identifier used to uniquely identify a URL. ID number 603 may also be assigned sequentially by the database system 30. For example, ID number 603 may be appended to the address of the server 301, and when a user 100 selects a link of the response, the user 100 is directed to the arbitrary link assigned by the server 301. The server 301, in response to the request for the arbitrary link, accesses the mapping in the table 601, and obtains the content requested. The server 301 may also filter content by replacing links with arbitrary ID numbers 603 as the information is returned to the client 209 or the user 100.

Table 601 includes link state information such as last checked information 604 which indicates when the link was last checked. State information may also include a last check status 605 which indicates the status of the link at the time at which the link was last checked. It should be understood that other methods for maintaining link information may be used.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto.

What is claimed is:

1. A method for processing a query on a database using a server operatively connected to the database, the method comprising:

presenting from the server, to a user, a plurality of query elements, each query element having a plurality of allowed query element values, the plurality of allowed query element values for each query element being presented to the user for selection of a query element value from the plurality of allowed query element values, the query element values not selected by the user being non-selected query element values;

receiving at the server, from the user, a selected query element value for at least one of the plurality of query elements;

retrieving information objects stored in the database, the database storing a first relevance value which defines a relevance of at least one information object with respect to the selected query element value and a second relevance value which defines a relevance of the at least one information object with respect to the non-selected query element value, the first relevance value and the second relevance value being assigned by a human editor other than the user, the first relevance value and the second relevance value being assigned before the plurality of query elements is presented to the user, the information objects being retrieved based on the first relevance value and the second relevance value, the database further including an index, the index associating at least one information object stored in the database with at least the selected query element value;

wherein retrieving the information objects based on the first relevance value and the second relevance value is performed by the server in response to receiving the selected query element value for at least one of the plurality of query elements, and returning query results to the user, the query results corresponding to the information objects.

2. The method of claim 1, further comprising ranking the query results according to the relevance value.

3. The method of claim 1, further comprising presenting the query results to the user on a graphical user interface.

4. The method of claim 3, wherein the graphical user interface is based on an Internet browser.

5. The method of claim 1, further comprising ranking the information objects according to a ranking scheme.

6. The method of claim 1, further comprising mapping the retrieved information objects into corresponding mapped information objects.

7. The method of claim 6, wherein the corresponding mapped information objects are numbers corresponding to the retrieved information objects.

8. The method of claim 7, further comprising arbitrarily assigning the numbers to the corresponding retrieved information objects.

9. The method of claim 7, further comprising sequentially assigning the numbers to the corresponding retrieved information objects.

10. The method of claim 1, wherein the index is formed using allowed query element values other than the selected query element values as well as the selected query element values.

11. The method of claim 1, further comprising using a formula to form the index.

12. The method of claim 1, further comprising calculating the index using the relevance value associated with a selected query element value.

13. The method of claim 1, further comprising checking a link state of an information object.

14. The method of claim 13, wherein the link state is a time of last check.

15. The method of claim 13, wherein the link state is a status of a link.

16. The method of claim 1, wherein the information objects comprise links.

17. The method of claim 16, wherein the links comprise Internet links.

18. A system for processing a database query, comprising:
a server;
a client coupled to the server through a network;
user interface running on the client;
a selector, implemented in the user interface, to present, to a user, a plurality of query elements, each query element having a plurality of allowed query element values, the plurality of allowed query element values for each query element being presented to the user for selection of a query element value from the plurality of allowed query element values, the query element values not selected by the user being non-selected query element values;
said server, receiving from the user, a selected query element value for at least one of the plurality of query elements;
a database coupled to the server, the database comprising information objects, the database storing a first relevance value which defines the relevance of at least one of the information objects with respect to the selected query element value and a second relevance value which defines a relevance of the at least one information object with respect to a non-selected query element value, the first relevance value and the second relevance value being assigned by a human editor other than the user, the first relevance value and the second relevance value being assigned before the plurality of query elements is presented to the user;
an indexer for forming an index to the database, the index associating at least one of the information objects with at least the selected query element value;
wherein information objects are retrieved from the database based on the first relevance value and the second relevance value, in response to the selection of the selected query element value by the user via the selector, wherein the information objects correspond to the index, and
wherein a result to the database query is returned to the user and the result corresponds to the information objects.

19. The system of claim 18, wherein the server comprises a structured query constructor for formulating the allowed query element values.

20. The system of claim 18, wherein the server comprises a query result presenter for presenting query results to the client.

21. The system of claim 20, wherein the query result presenter ranks the query results.

22. The system of claim 18, further comprising a classification-based analyzer, coupled to the database, for analyzing data based on the query.

23. The system of claim 18, wherein the user interface is a graphical user interface.

24. The system of claim 23, wherein the graphical user interface is Internet browser-based.

25. The system of claim 18, wherein the database is a relational database.

26. The system of claim 18, wherein the information objects comprise links.

27. The system of claim 26, wherein the links comprise Internet links.

28. The system of claim 18, wherein the database comprises a link state of an information object.

29. The system of claim 28, wherein the link state comprises a time of last check.

30. The system of claim 28, wherein the link state comprises a status of a link.

31. The system of claim 18, further comprising a mapper for mapping a retrieved information object to a mapped information object.

32. A method for processing a query on a database using a server operatively connected to the database, the method comprising:
presenting from the server, to a user, a plurality of query elements, each query element having a plurality of allowed query element values, the plurality of allowed query element values for each query element being presented to the user for selection of a query element value from the plurality of allowed query element values, the query element values not selected by the user being non-selected query element values;
receiving at the server, from the user, a selected query element value for at least one of the plurality of query elements;
retrieving information objects stored in the database, the database storing a relevance value which defines a relevance of at least one information object with respect to the selected query element value and a second relevance value which defines a relevance of the at least one information object with respect to the non-selected query element value, the relevance value and the second relevance value being assigned by a human editor other than the user, the relevance value and the second relevance value being assigned before the plurality of query elements is presented to the user, the information objects being retrieved based on the relevance value and the second relevance value, the database further including an index, the index associating at least one information object stored in the database with at least one selected query element value; and
presenting, to the user, mapped information objects representing the information objects retrieved from the database, each mapped information object comprising a hyperlink, each hyperlink comprising a number assigned to the respective information object to obscure the respective information object;
wherein retrieving the information objects based on the relevance value and the second relevance value is performed by the server in response to receiving the selected query element value for at least one of the plurality of query elements, and
returning query results to the user, the query results corresponding to the information objects.

* * * * *